United States Patent [19]

Meyer et al.

[11] 4,150,894

[45] Apr. 24, 1979

[54] EXPOSURE CONTROL SYSTEM FOR COLOR PRINTERS

[75] Inventors: Armin Meyer, Belfaux; Jörg Müller, St. Silvester; Bruno Brändli, Ependes; Robert Wahli, un Terengstrigen, all of Switzerland

[73] Assignee: Gretag Aktiengesellschaft, Regensdorf, Switzerland

[21] Appl. No.: 872,924

[22] Filed: Jan. 27, 1978

[30] Foreign Application Priority Data

Feb. 1, 1977 [CH] Switzerland .................... 1182/77

[51] Int. Cl.² .............. G03B 27/78; G01N 21/06; G01N 21/22
[52] U.S. Cl. ................... 355/38; 356/404; 356/443
[58] Field of Search .............. 355/38, 35, 68, 83, 355/88; 356/175, 202, 203; 250/559, 226

[56] References Cited

U.S. PATENT DOCUMENTS

| | | | |
|---|---|---|---|
| 3,447,871 | 6/1969 | Neale | 355/38 |
| 3,482,916 | 12/1969 | Mey et al. | 355/38 |
| 3,724,947 | 4/1973 | Paulus | 355/38 |
| 3,873,201 | 3/1975 | Amano | 355/38 X |
| 3,888,580 | 6/1975 | Amano et al. | 355/38 |

FOREIGN PATENT DOCUMENTS

| | | | |
|---|---|---|---|
| 1448225 | 9/1976 | United Kingdom | 355/38 |
| 1419343 | 12/1975 | United Kingdom | 355/38 |

*Primary Examiner*—L. T. Hix
*Assistant Examiner*—W. J. Brady
*Attorney, Agent, or Firm*—Burns, Doane, Swecker & Mathis

[57] ABSTRACT

An exposure control system for color printers having electro/optical means for spectral analysis of different types of original material for printing to determine different spectral coefficients for each material. Each coefficient is classified according to a reference range of values, each range being associated with a different original material. Photoelectric means are provided to determine the color densities of an original and a store stores sets of exposure parameters, each set being associated with a different original material. Automatic selection means responsive to the classification is provided to select whichever parameter set is associated with a coefficient reference range in which the coefficient has been classified during classification.

7 Claims, 1 Drawing Figure

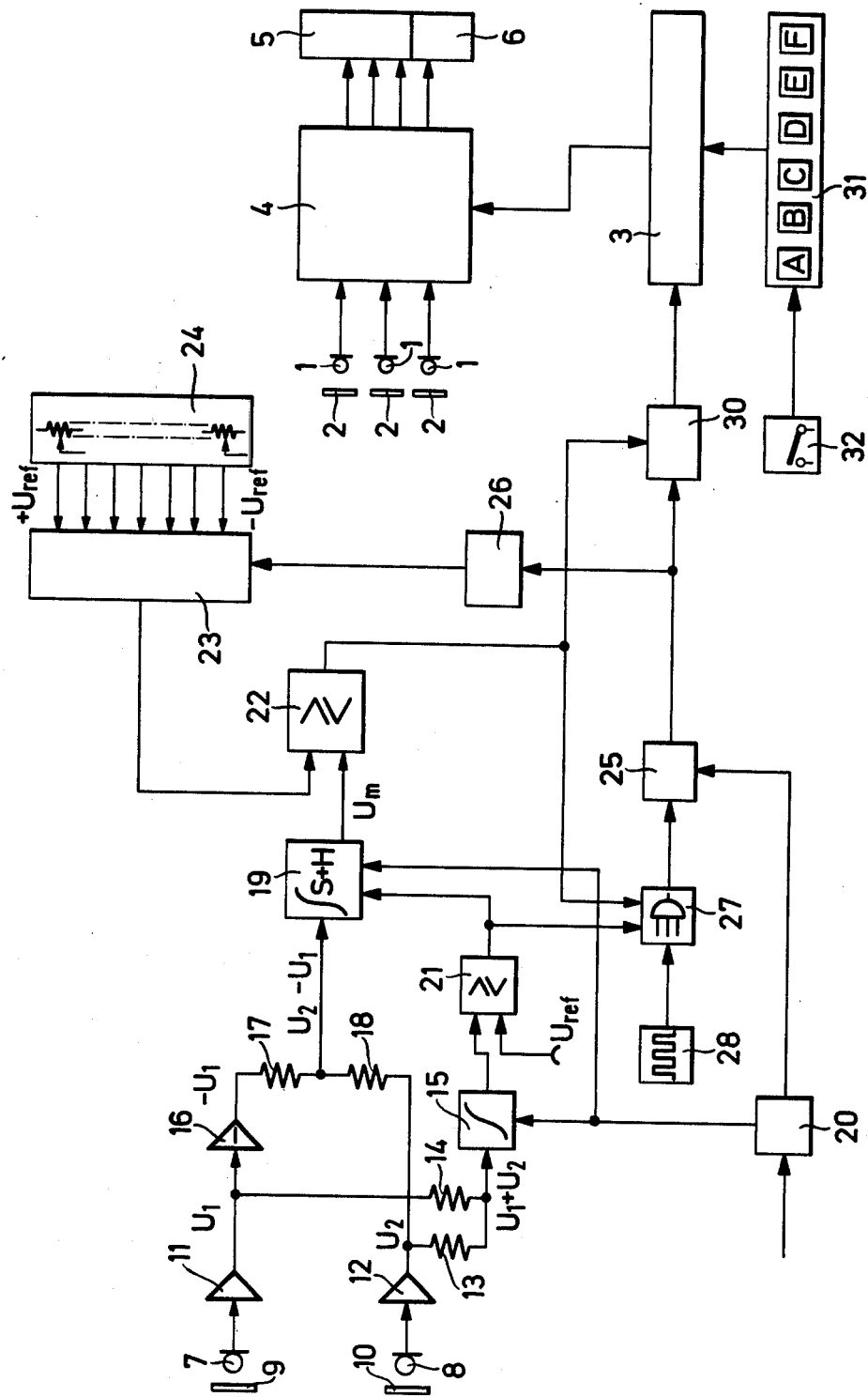

EXPOSURE CONTROL SYSTEM FOR COLOR PRINTERS

FIELD OF THE INVENTION

This invention relates to an exposure control system for colour printers.

In order to produce satisfactory prints either the printer or its exposure control system must be carefully set up. This operation is usually carried out by test prints and takes into account the type or make of the original from which prints are to be made. In practice, different makes of negative and transparency film material differ considerably from one another, so that in practice a different adjustment is necessary for each different make of film.

PRIOR ART

To avoid having to carry out a completely fresh adjustment to the printers' exposure control system whenever a different make of negative or transparency is used, the applicants' colour printer GRETAG 3116, for example, is provided with a film type parameter store in which six different adjustments are stored, each of which are characterised by a red, green, blue and density parameter value and which can be manually called for as necessary by one of six keys. This is described in detail, for example, in U.S. Pat. No. 3,482,916. In this way the exposure control system can be conveniently adjusted or converted to the respective film makes.

When negatives are printed, they are usually pre-sorted by makes or types and joined to form long strips so that the make does not change very often. When transparencies are printed however, the makes may vary from one original to the next, since transparencies have usually been cut into single frames and mounted. During printing therefore, the makes usually vary widely, so that the printer or its exposure control system has to be changed very frequently. In addition, it is usually not such a simple matter to discover the film make or type of transparency as it is with negatives because of the mounts, and the operation is accordingly tedious and time-comsuming. Printing outputs are therefore relatively low where transparencies are concerned.

In U.S. Pat. No. 3,447,871 there is disclosed a negative colour printer which automatically adjusts to the negative make concerned. In this printer however, unlike the invention, the electrical signals which influence the exposure parameters, i.e. the control system, are not selected according to make; instead, the most important parts of the exposure control system have a three-fold function according to three types of negative material that the printer is designed to handle, only the function required at any one time is used for exposure control. Selection of whichever function is required at any one time is effected on the basis of different masking of the three negative types.

This type of make or film exposure control system is very expensive and can only be extended to more than three types of film with difficulty. The most important disadvantage however, is that it is unsuitable for transparency material which does not need the same form of masking.

An article by C. M. Graebe, of Kodak Limited, entitled "Identification of transparencies with different duplicating properties" published in "Professional Printer", Volume 20, No. 1, 1976 describes how the transmission behaviour of the CYAN layer differs in different makes of transparencies. To determine this difference the spectral density of the CYAN dye at a manually selected area of a transparency at a wavelength of about 620±25 nm, is compared with the density at a wavelength of about 675±25 nm to form a characteristic ratio known as the red density test ratio. This ratio is obtained for each make of transparency and is substantially determined by the ratio of the densities, i.e. the negative logarithms of the transmission values at a selected point of the transparency material and at said wavelengths.

This article discloses nothing concerning the application of this form of identification to the automatic adjustment of printers for different makes of film material. Furthermore, determination of the red density test ratios is relatively expensive.

The object of the invention is to automate the identification of the type or make of film material to be printed and the selection of those parameter values that are required in each case. In particular the invention seeks to provide an exposure control system which adjusts or converts automatically to different makes of film, particularly of transparency material.

SUMMARY OF THE INVENTION

In accordance with this invention therefore we provide an exposure control system for a colour printer, adapted to produce prints from different types of original colour material comprising photo-electric means for determining the colour densities of an original; a store for storing sets of exposure parameters, each set being associated with a different original material; means for spectral analysis of an original; means responsive to said spectral analysis means to form a coefficient representative of that original; classification means for classifying each coefficient in one of a plurality of ranges of coefficient reference values, each range being characteristic of a different material; means responsive to said classification means for automatically selecting a set of exposure values from said store that is associated with the respective coefficient reference range of values in which the coefficient for a particular original is classified by said classification means.

DETAILED DESCRIPTION OF A PREFERRED EMBODIMENT

A preferred embodiment of the invention will now be explained with reference to the drawing which is a block schematic of an exposure control system according to the invention.

As stated in the cited article in the "Professional Printer", one of the main distinguishing features of different makes of transparency material is the spectral transmission of the CYAN dye in the range between approximately 600 and 700 nm. In the preferred embodiment of the invention, two voltage values $U_1$ and $U_2$ proportional to the transmissions (or at least the densities) of the photographic material are derived from two narrow-band transmission measurements of the total transparency area at wavelengths of $\lambda_1 = 635$ nm and $\lambda_2 = 685$ nm with widths of about 20 nm at half the maximum intensity and a Make Quotient F is derived from these voltage values $U_1$ and $U_2$, respectively in accordance with the formula:

$$F = U_1 - U_2 / \tfrac{1}{2}(U_1 + U_2).$$

Experiments have shown that this Make Quotient is characteristic of each type of film material and has only a relatively small variation which is dependent upon development, film age, emulsion differences, subject, and so on. The Make Quotient F can thus be utilised to determine the material type and hence form a basis for automatically controlling the make parameter selection and actual exposure control. One important advantage of the invention over the method according to the publication by C. M. Graebe already mentioned is that in this case the entire transparency area can be utilised for the measurement while in the case of Graebe a suitable portion of the transparency area has to be set up manually.

Calculation of the quotient $$F = U_1 - U_2 / U_1 + U_2 \cdot 2$$

from the two voltages $U_1$ and $U_2$ cannot be achieved easily by electronic analog methods. Although commercial analog dividers are available, they are relatively expensive. According to another important aspect of the preferred embodiment of the invention, this difficulty is obviated by reducing the division $2(U_1 - U_2) \div (U_1 + U_2)$ in principle to the formation of the difference $(U_1 - U_2)$. For this purpose, the denominator $(U_1 + U_2)$ must assume a constant value. This could be achieved by automatic gain control. However, it is more advantageous and simpler to use the following method wherein the numerator and denominator of the quotient $F = 2(U_1 - U_2) \div (U_1 + U_2)$ are integrated separately until the denominator integral assumes a predetermined reference value $U_{ref}$. If $U_m$ is the numerator integral, the Make Quotient F is then obtained from $U_m / U_{ref}$, in which $U_{ref}$ is, by the above hypothesis, constant so that F is determined substantially only by $U_m$. A particularly advantageous feature of this method is that the integrations required can very easily be carried out in operational amplifiers in combination with the addition and subtraction operations, the signals being smoothed by the integrations. The operational amplifiers can also be constructed as sample and hold amplifiers for the subsequent evaluation of the integral $U_m$.

Practical measurements have shown that F is always within the limits of $-1.0$ and $+1.0$, i.e.:

$$-1.0 \leq F = U_m / U_{ref} \leq +1.0$$

This leads to providing a range of values for $F \cdot U_{ref}$ and sub-dividing them into six sub-ranges between the voltage values $+U_{ref}$ and $-U_{ref}$, the number of ranges corresponding to the number of the commonest film makes. This is done, for example, by suitably dimensioned voltage dividers, the sub-ranges being allocated to six different printer parameter groups A–F. All that is then necessary is to check the sub-range occupied by the value $U_m$ to enable the corresponding set of parameters to be selected.

This check or classification of the value $U_m$ can be carried out in various ways. According to the preferred embodiment of the invention however it is advantageous and simple for an analog multiplexer to compare consecutively with $U_m$ the voltages corresponding to the sub-range limits, the number of comparisons giving the classification apart from a change of sign of the result of the comparison.

The exposure control system shown in the drawing comprises three photo-receivers 1 with colour filters 2 in front of them, a store 3 for six different sets of exposure parameters A–F according to the make of film, a processing stage 4 and a keyboard 31 for manual selection and feeding the stored parameter sets to the processing stage 4. The transparency values of a transparency to be printed (not shown) are determined by the photo-receivers 1 and from these values, together with the respective exposure parameters, control signals are produced by the processing stage 4 to control three printing filters 5 and a shutter 6. The exposure control system thus far corresponds to the Applicants' printer GRETAG 3116 mentioned hereinbefore, or that disclosed in U.S. Pat. No. 3,482,916.

The novel feature in comparison with these known control systems is the automatic selection in each case of the required exposure parameters. To this end, two photo-receivers 7 and 8 are provided with two narrow-band separation filters 9 and 10, whose main transmissions are at wavelengths of 635 and 685 nm and whose widths at half maximum intensity are approximately 10 to 20 nm. The red transmission of the transparency is determined at these two wavelengths by the photo-receivers 7 and 8. In practice just one photo-receiver or a number of receivers connected in parallel could be provided. The currents produced by the photo-receivers are amplified in two amplifiers 11 and 12 and yield two voltage values $U_1$ and $U_2$ proportional to the transparencies of the transparency at the two measuring wavelengths. These voltages are fed via resistors 13 and 14 to an adding integrator 15, $U_1$ also being fed via an inverter 16 to resistor 17 and $U_2$ direct to resistor 18. The value $U_2 - U_1$ at the junction of the resistors 17 and 18 is fed to an adding and simultaneously integrating sample and hold amplifier 19.

At or before the start of each individual measuring operation, the integrator 15 and the sample and hold amplifier 19 are set to zero by a start logic stage 20. The signal delivered at the output of the integrator 15 corresponds to the integral of the sum of the two voltage values $U_1$ and $U_2$ per unit of time and is fed to a comparator 21 which continuously compares it with a fixed predetermined reference voltage $U_{ref}$. As soon as the output signal from integrator 15 reaches the reference voltage $U_{ref}$, comparator 21 responds and thus brings the integrating sample and hold amplifier 19 into the hold state completing integration of the difference between the two voltages $U_1$ and $U_2$ at its input. The output signal $U_m$ of amplifier 19 then corresponds to the integral of the differences $(U_1 - U_2)$.

This signal $U_m$ is then successively compared with the following seven voltage values by means of another comparator 22 and a multiplex stage 23, the seven values being held in readiness in a store 24 formed, for example, by potentiometers connected to suitable voltage sources: 1.00 $U_{ref}$; 0.82 $U_{ref}$; 0.46 $U_{ref}$; 0.22 $U_{ref}$; $-0.17\ U_{ref}$; $-0.34\ U_{ref}$; and $-1.00\ U_{ref}$.

These seven voltage values define six voltage ranges each characteristic of a transparency material type and into one of which the signal $U_m$ falls.

Of course, the voltage values indicated are only an example and may differ according to the corresponding film makes. For example, the bottom negative value may also be somewhat less, e.g. approximately $-0.78\ U_{ref}$ instead of $-1.0\ U_{ref}$.

The multiplex stage 23 is controlled by a binary counter 25 and a decoder 26. Counter 25, which is re-set by way of the start logic stage 20 at the start of each measuring operation receives counting pulses from a pulse generator 28 via a gate 27.

As soon as the comparator 21 responds, gate 27 is opened and counter 25 starts to count. The voltage values present in the store 24 then pass successively to the comparator 22 under the control of the decoder 26 and the multiplex stage 23. As soon as one of these voltage values is less than the signal $U_m$, comparator 22 responds and stops the counter 25 via the gate 27. At the same time, it opens another decoder 30 connected to the counter 25. From the counter state the decoder 30 decodes the number of comparison operations carried out by the comparator 22 and hence the voltage range in which the signal $U_m$ is situated.

The parameter sets A–F stored in the store 3 are each allocated a voltage range defined in the store 24. Like the keyboard 31, the decoder 30 controls the store 3 so that the parameter set corresponding to the make of the original to be printed is transferred from the store 3 to the processing stage 4.

When the automatic make detection and parameter selection system described hereinbefore is started a contact 32 is operated to lock the keyboard 31 and thereby prevent interference with the automatic selection of the contents of the store 3.

What is claimed is:

1. An exposure control system for a colour printer adapted to produce prints from different types of original colour material comprising:
   (1) photo-electric means for determining the colour density of an original;
   (2) a store for storing sets of exposure parameters, each set being associated with a different original material;
   (3) means for spectral analysis of an original;
   (4) means responsive to said spectral analysis means to form a coefficient representative of that original;
   (5) classification means for classifying each coefficient in one of a plurality of ranges of coefficient reference values, each range being characteristic of a different original material;
   (6) means responsive to said classification means for automatically selecting a set of exposure values from said store that is associated with the respective coefficient reference range of values in which the coefficient for a particular original is classified by said classification means.

2. Apparatus according to claim 1, wherein said spectral analysis and coefficient determining means comprise optical and electrical means determining the transmission or density of an original at two predetermined wavelengths and determines the coefficient from the quotient of the difference and the sum of the transmissions or densities at the two predetermined wavelengths.

3. Apparatus according to claim 2, wherein said electrical means comprise a subtraction unit forming the difference between the two transmission values, an adding unit forming the sum of the two transmission values, a first and a second integrator for integration of respectively the difference and sum of the transmission values per unit of time, and a threshold detector which stops the first integrator as soon as the integral of the transmission sum per unit of time formed by the second integrator reaches a predetermined threshold value.

4. Apparatus according to claim 3, wherein the classification means comprise a coefficient reference range store and means for comparing the stored coefficient reference ranges with the integral of the transmission difference per unit of time formed by the first integrator.

5. Apparatus according to claim 4, wherein the comparison means comprise a comparator and a multiplexer which successively applies to the comparator the voltage values stored in the coefficient reference range store until the comparator output state changes.

6. Apparatus according to claim 5, including a decoder which decodes the number of comparison operations carried out by the comparator and releases a set of exposure parameters corresponding to said number of operations stored in the store.

7. Apparatus according to claim 1, including a keyboard for selecting an exposure parameter set in the store, and circuitry which automatically locks the keyboard during operation of the spectral analysis and classification means.

* * * * *

UNITED STATES PATENT AND TRADEMARK OFFICE
CERTIFICATE OF CORRECTION

PATENT NO. : 4,150,894
DATED : April 24, 1979
INVENTOR(S) : Armin Meyer et al

It is certified that error appears in the above-identified patent and that said Letters Patent are hereby corrected as shown below:

Column 1, line 44, change "time-comsuming" to --time-consuming--.

Column 2, after line 18, insert --OBJECT OF THE INVENTION--.

Column 3, the equation at line 17 should be as follows:

$$F = \frac{U_1 - U_2}{U_1 + U_2} \cdot 2$$

In Robert Wahli's address change "un Terengstrigen" to --Unterengstringen--.

Signed and Sealed this

Eighteenth Day of September 1979

[SEAL]

Attest:

LUTRELLE F. PARKER
*Attesting Officer      Acting Commissioner of Patents and Trademarks*